May 10, 1938.   C. L. LEMMON   2,116,606
SYSTEM FOR MEASURING THE CHARACTERISTICS OF ELECTRICAL APPARATUS
Filed Nov. 17, 1934   4 Sheets-Sheet 2

INVENTOR
C. L. LEMMON
BY H. Q. Whitehorn
ATTORNEY

May 10, 1938. C. L. LEMMON 2,116,606
SYSTEM FOR MEASURING THE CHARACTERISTICS OF ELECTRICAL APPARATUS
Filed Nov. 17, 1934 4 Sheets-Sheet 4

INVENTOR
C. L. LEMMON
BY H. R. Whitehorn
ATTORNEY

Patented May 10, 1938

2,116,606

UNITED STATES PATENT OFFICE 2,116,606

SYSTEM FOR MEASURING THE CHARAC-
TERISTICS OF ELECTRICAL APPARATUS

Clair L. Lemmon, Mount Airy, Md., assignor to
Western Electric Company, Incorporated, New
York, N. Y., a corporation of New York Application November 17, 1934, Serial No. 753,507

18 Claims.  (Cl. 179—175.3)

This invention relates to systems for measuring the characteristics of electrical apparatus, and more particularly to an automatic capacitance measuring and recording system.

It is an object of the present invention to provide a system for automatically measuring and recording characteristics of electrical apparatus.

In accordance with one embodiment of the invention there is provided apparatus for automatically measuring and recording the capacity unbalance between two pairs of conductors in a telephone cable; the capacity unbalance between a phantom circuit, embodying the four wires of the two pairs of wires, and each pair of wires, and the capacitance to ground from each wire of the four wires.

Figure 1:
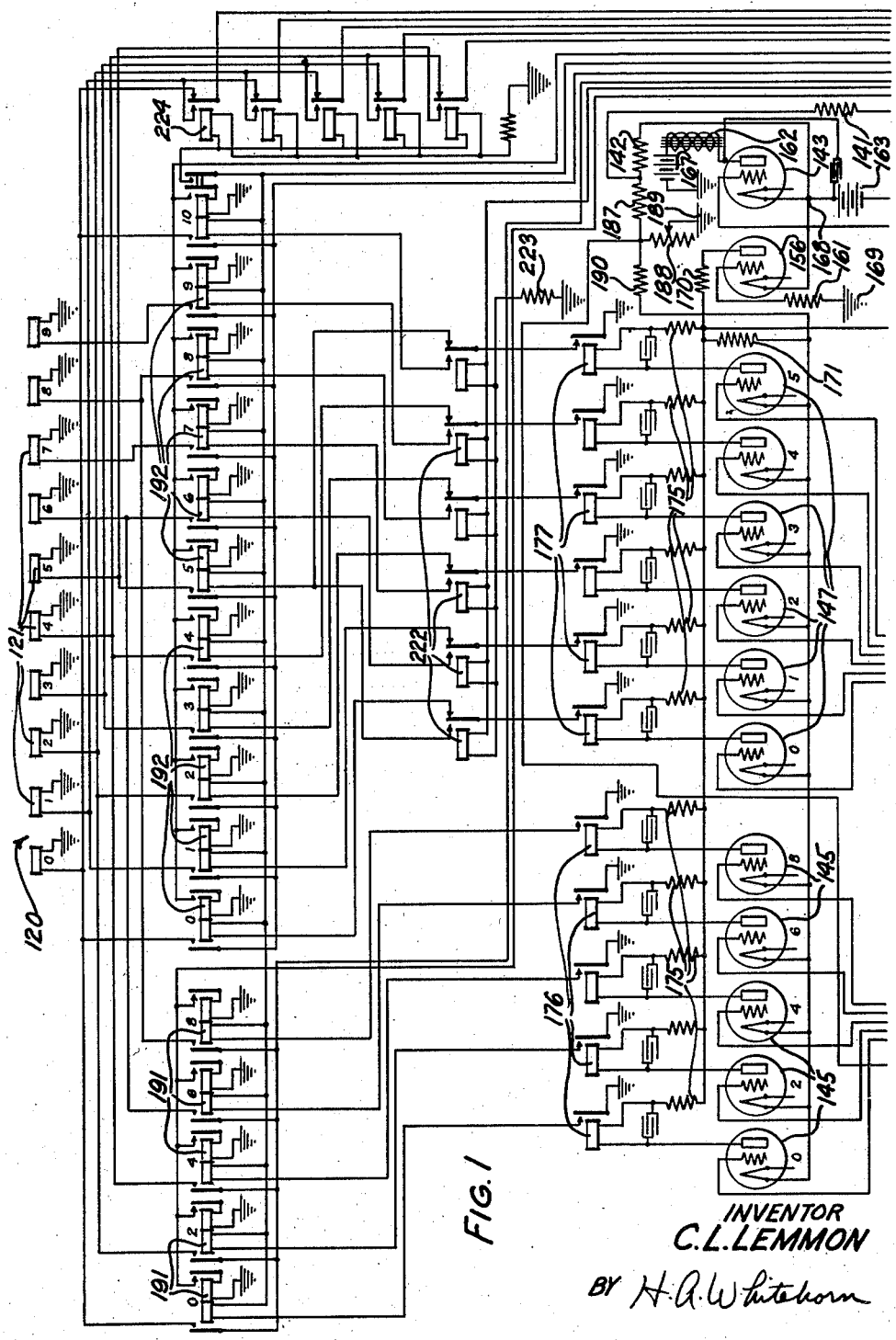
Figure 2:
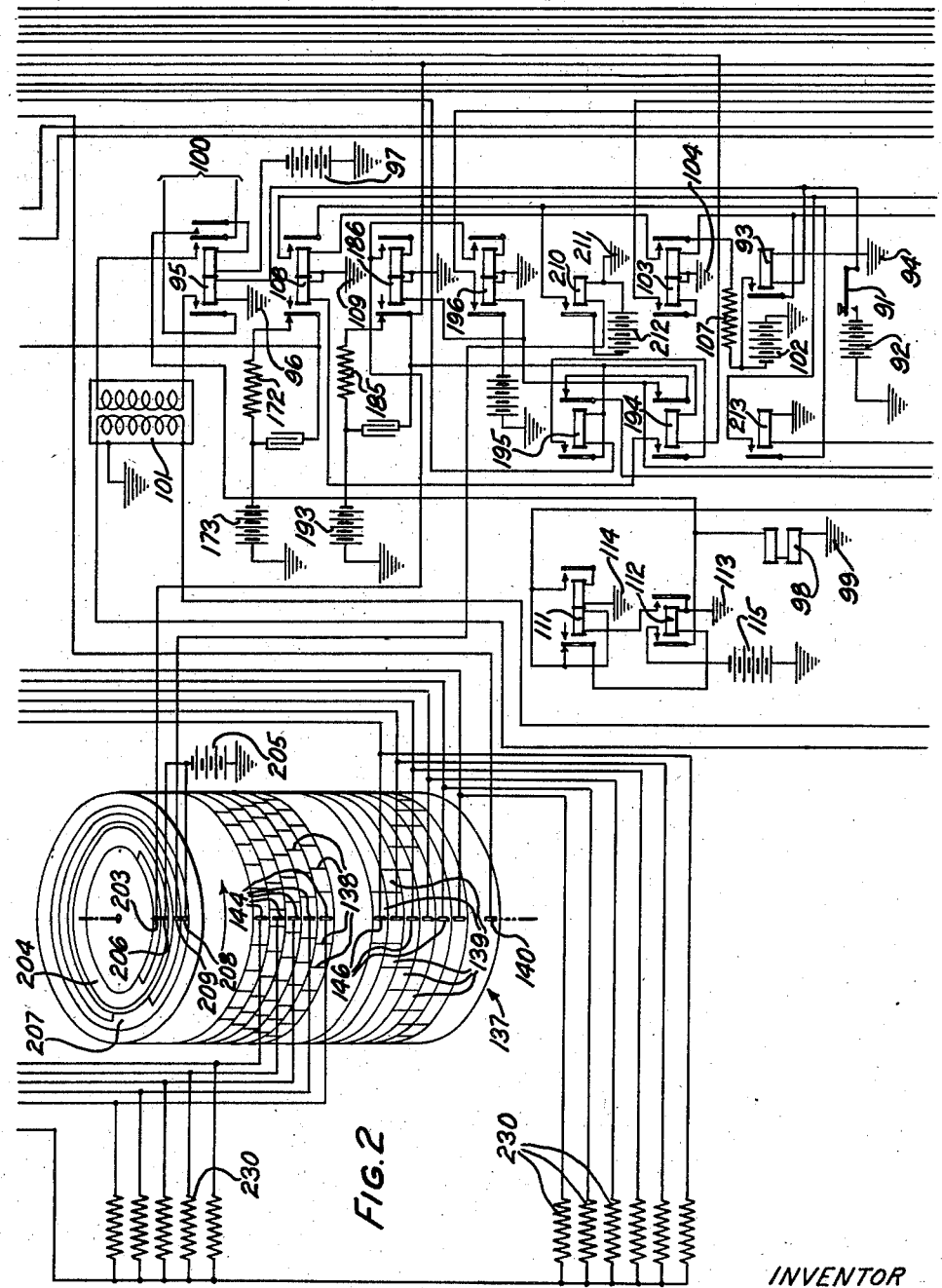
Figure 3:
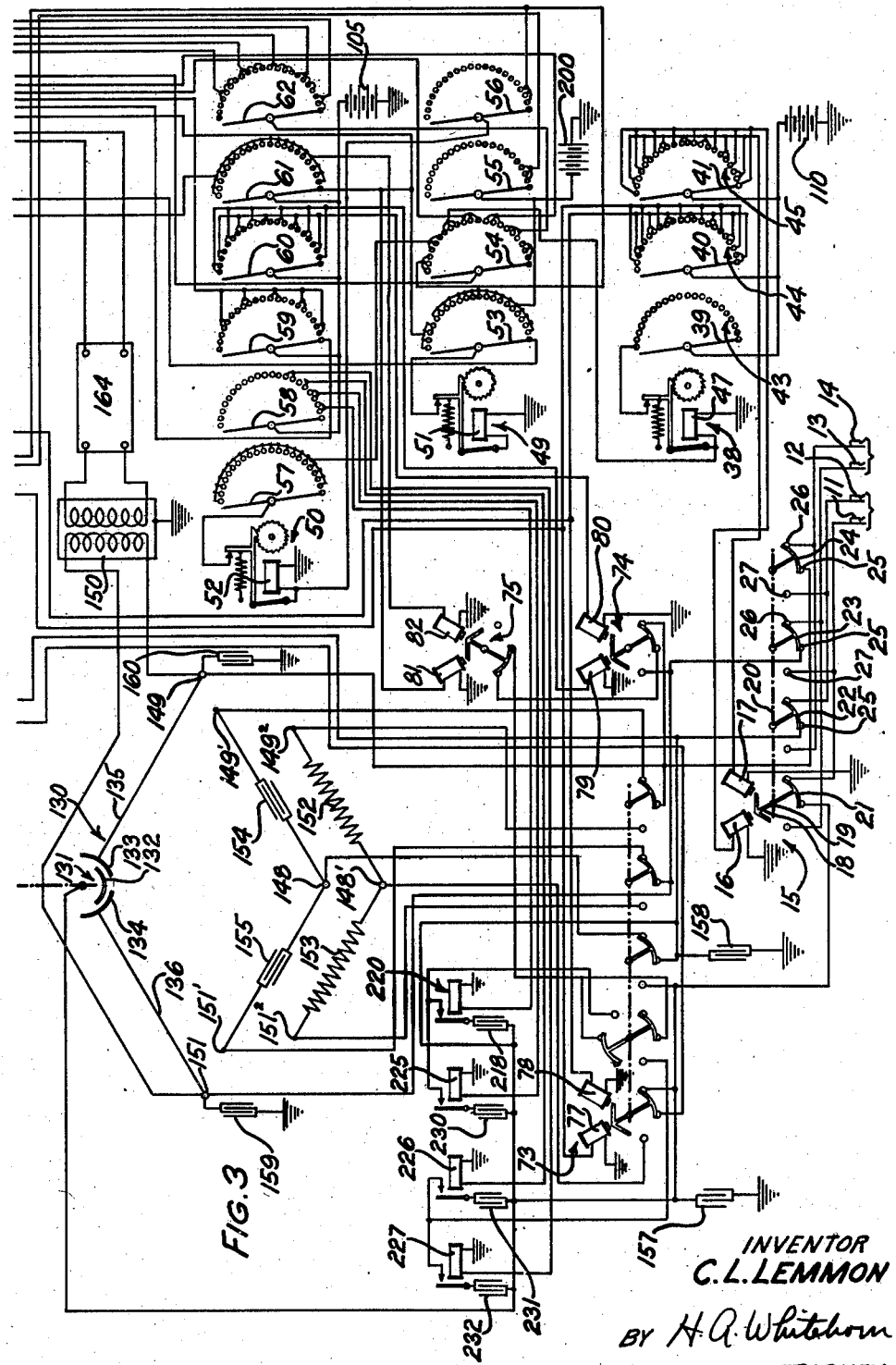
Figure 4:
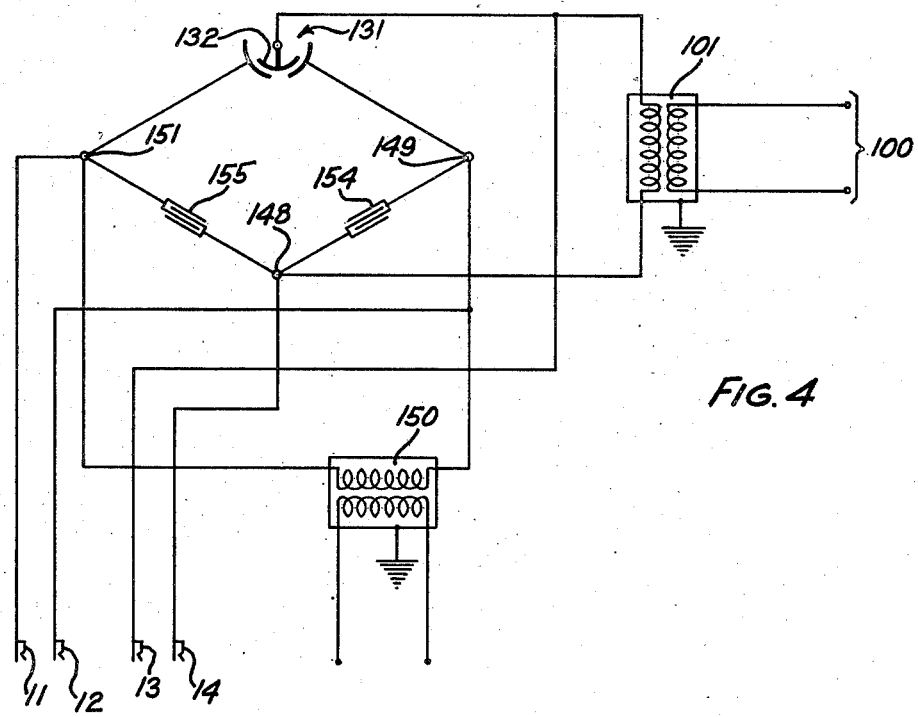
Figure 5:
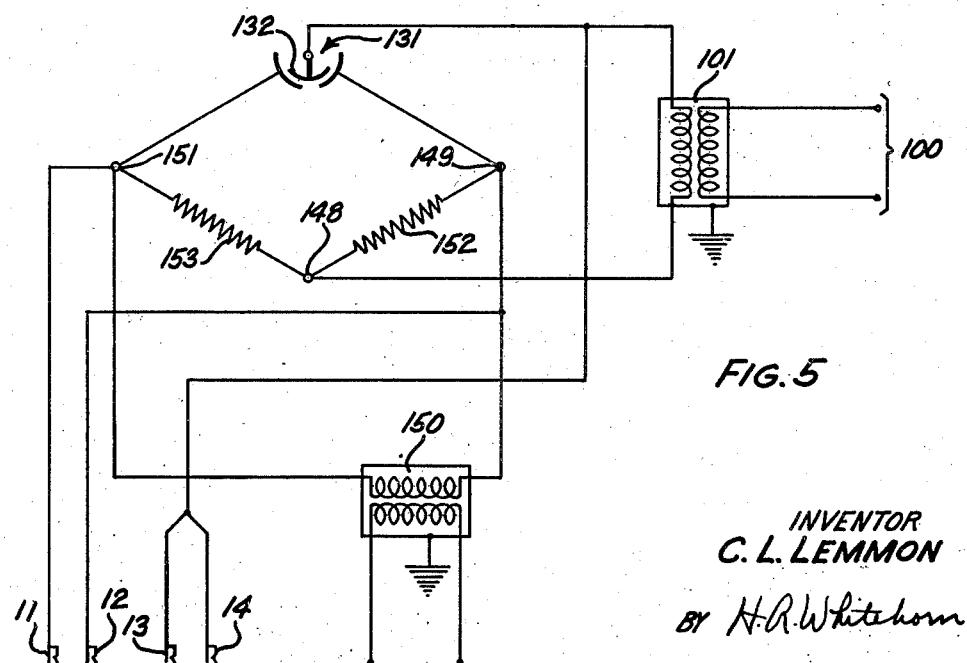

Other features of the invention will be apparent from the following detailed description, reference being had to the accompanying drawings, wherein Figs. 1, 2 and 3 are circuit diagrams which when viewed collectively with Fig. 1 placed directly above Fig. 2 and Fig. 3 placed directly below Fig. 2, disclose schematically a system for measuring and recording the capacitance between circuits formed by the wires of a telephone cable;

Fig. 4 is a circuit diagram which shows schematically the circuit as connected to measure the capacitance between the two pairs of conductors in the cable, and Fig. 5 is a circuit diagram which shows schematically the circuit as connected to measure the capacitance between the phantom circuit and one of the pairs of wires.

In the embodiment of the invention disclosed herein the two pairs of wires of the telephone cable between which it is desired to measure the capacitance are connected to an alternating current capacitance bridge circuit including a motor driven air condenser having associated therewith a commutator which rotates with the movable plates of the motor driven air condenser. The capacitance between the two pairs of conductors is measured within the limits of the capacity of the motor driven condenser, and in the event that the unbalance between the pairs of conductors is greater than the maximum value of the motor driven condenser, additional fixed condensers are automatically included in the circuit until a condition of balance is arrived at by the bridge, whereupon the bridge which has a thermionic valve connected thereto through a transformer, will operate the valve and cause it to trip a second valve which in turn will complete circuits to those of a plurality of valves having the grids thereof connected to brushes engaging the commutator to trip these valves which in turn control through a series of relays a solenoid controlled typewriter.

After the capacitance unbalance between the pairs of wires has been measured, the bridge will automatically be started through a control system comprising groups of relays and selector switches to connect the four wires of the two pairs of wires to the bridge in a different manner to measure the capacitance between one pair of wires and the phantom circuit which will eventually include all four wires of the two pairs of wires. This measurement is made and recorded in substantially the same manner as the measurement between the two pairs of wires whereupon the control system will automatically test the capacitance between the other pair of wires and the phantom circuit. The measurements so determined will then be recorded, and a sounder will be operated to indicate that the test of the four wires is completed.

Referring to the drawings in which similar parts are designated by the same numerals in the several views, it is believed that a clear understanding of the invention will be had therefrom when considered in conjunction with the following description.

All of the electro-mechanical parts of the system have been shown in their normal inoperative positions to simplify the disclosure; however, it will be understood that the various parts, in the operation of the system, will assume different positions from those shown on the drawings, and these positions will be pointed out in connection with the detailed description of the device.

Referring now to the circuit diagram as disclosed in Figs. 1, 2 and 3, particular reference being had to Fig. 3, there are shown four connecting clips 11, 12, 13 and 14 to which may be connected the four wires forming a "quad" in a telephone cable. A "quad" in a telephone cable is a group of four wires which are arranged, as is well known in telephone practice, to carry three talking circuits comprising two side circuits and one phantom circuit. The method of connecting a "quad" of wires in a telephone circuit to provide three circuits for carrying telephonic conversations is well known and will not be described in detail herein, it being deemed sufficient to state that one talking circuit utilizes two wires and comprises one of the side circuits, the other side circuit utilizes the other two wires and constitutes the second circuit, and all four wires are connected to form the third or phantom talking circuit. In the specific embodiment of the invention chosen as an example the system is being used to test the "cross-talk" between the various circuits, that is, between the two side circuits and between the phantom circuit and each side circuit, by measuring the capacitance between the various circuits.

In testing a "quad" of the telephone cable one pair of wires is individually secured to the clips 11 and 12 and the other pair is secured to the clips 13 and 14. For the sake of convenience the pair of wires secured to the clips 11 and 12 will be hereinafter termed "side 2" and the pair of wires secured to the clips 13 and 14 will be termed "side 1". In the use of the system, the cable may be positioned remotely from the apparatus making up the testing system and connected thereto by conductors connected to the clips 11, 12, 13 and 14, and the control for the entire circuit may be located adjacent the cable so that the operator who secures the "quad" to the clips may, upon securing them, start the system in operation to measure the cross-talk in the quad.

The clips 11, 12, 13 and 14 are connected to contacts of a two-way switch indicated generally by the numeral 15 and comprising a pair of electromagnets 16 and 17 having a common armature 18 pivoted at 19 and having fixed thereto a shaft 20 on which are mounted four contact arms 21, 22, 23 and 24. Each of the contact arms 21, 22, 23 and 24 has associated therewith a middle contact 25, a right hand contact 26 and a left hand contact 27 and is adapted upon energization of the electromagnet 16 to interconnect its middle contact 25 and right hand contact 26, and upon energization of the electromagnet 17 to interconnect its middle contact 25 and its left hand contact 27. The two-way switch 15 is controlled by a selector switch 38 having brushes 39, 40 and 41, associated with contact banks 43, 44 and 45, respectively. The selector switch 38 is the well known selector switch used in automatic telephone systems, and is adapted upon energization and deenergization of its electromagnet 47 to step the brushes 39, 40 and 41 from one contact on their associated banks to the next contact.

In addition to the selector switch 38 there are provided similar selector switches 49 and 50 operated under control of electromagnets 51 and 52, respectively. The switch 49 controls the operation of four brushes 53, 54, 55 and 56 and the selector switch 50 controls the operation of six brushes 57, 58, 59, 60, 61 and 62. These selector switches have been provided for the purpose of controlling the operation of the two-way switch 15 and two-way switches 73, 74 and 75 and various relays throughout the system. The switch 73 is provided with a pair of electromagnets 77 and 78, the switch 74 is provided with electromagnets 79 and 80, and the switch 75 is provided with electromagnets 81 and 82 in exactly the same manner as the electromagnets 16 and 17, but are controlled through different selector switches than the electromagnets 16 and 17.

The means for connecting a cable quad to the system having been described briefly, it is believed that a clear understanding of the invention may be had from the following description of the operation of the system in measuring the capacitance unbalance of a cable "quad" which is assumed to have a side to side unbalance of +26 mmf., a phantom to side one unbalance of +102 mmf. and a phantom to side two unbalance of −256 mmf.

The system is so arranged at the start of any testing operation, that the selector switch 38 has its brushes 39, 40 and 41 on either the 3rd, 6th, 9th, 12th, 15th, 18th or 21st contacts of their associated banks of contacts 43, 44 and 45, and the selector switches 49 and 50 have their brushes on the 1st contacts of their associated banks of contacts. At the start of a testing operation the selector switch 38 will be assumed to have its brushes 39, 40 and 41 on the third contacts of their associated banks of contacts 43, 44 and 45 and that selector switches 49 and 50 have their brushes in engagement with their first contacts. With the switch 38 in the third position, the electromagnet 77 will be operated in a circuit from grounded battery 110 through brush 40, 3rd contact of bank 44 and winding of electromagnet 77 to ground and the electromagnet 17 will be operated in a circuit from grounded battery at 110 through brush 41 and winding of the electromagnet 17 to ground. With the switch 50 in the 1st position, the electromagnet 81 is operated in a circuit from grounded battery 105 through brush 61, 1st contact of bank 61, winding of electromagnet 81 to ground. The operation of the two electromagnets 77 and 17 will arrange the system to make a measurement of the capacity unbalance between the two sides of the quad and the clips 11, 12, 13 and 14 having the wires of the quad connected thereto will be connected to a capacitance unbalance bridge 130 in the manner shown in Fig. 4.

The bridge 130 includes a motor driven air condenser 131 having a movable plate 132 and fixed plates 133 and 134. The fixed plate 133 is connected to an arm 135 of the bridge and the fixed plate 134 is connected to an arm 136 of the bridge. The motor driven condenser has a maximum capacity of 60 mmf. and is constantly driven at a predetermined speed through its cycle so that it will change the capacity unbalance of the bridge 130 from minus 58 mmf. through zero to plus 58 mmf. by starting with 58 mmf. in arm 135 and subtracting capacity from that arm and adding it in the arm 136.

Connected to and driven with the motor driven air condenser 131 is a commutator 137 (Fig. 2) having a plurality of units contacts 138 and a plurality of tens contacts 139 thereon, which are all connected through a common brush 140, resistances 141 and 142 to the filaments of a pair of thermionic valves 143 and 156. There are associated with the units contacts 138 five brushes 144 which are connected individually to the grids of five gas filled thermionic valves 145 and there are provided six brushes 146 associated with the tens contacts 139 for successively interconnecting the tens contacts to the grids of associated gas filled thermionic valves 147. The commutator 137 has thereon six contacts 139 representing the values 0, 1, 2, 3, 4 and 5 in the tens denomination for controlling the recording of a positive condition of unbalance, and six similar contacts for controlling the recording of a negative unbalance. Each of the contacts in the tens denomination engages its associated brush for a period of time equal to the time required for the motor driven condenser 131 to move through a distance wherein the capacitance of the condenser changes 10 mmf. Each contact in the tens denomination has associated therewith a set of five units contacts representing the units value, 0, 2, 4, 6, and 8. When the bridge reaches a condition of balance, circuits will be established through the brushes 144 and 146 which at that time are in contact with their associated contacts on the commutator.

Assuming that the system is properly set up, that is, the filaments of all of the thermionic valves are lighted, a sheet of paper in a typewriter 120 shown schematically in Fig. 3, and the motor driven condenser rotating, a quad may be secured to the clips 11, 12, 13 and 14 and a start key 91 operated. A preferred type of typewriter is that known commercially as the "Remington Vertical Adder" the numerical keys of which are in the present embodiment of the invention operated by solenoids 121. Momentary operation of the start key 91 will connect grounded battery at 92 through the winding of relay 93 to ground 94 causing relay 93 to operate momentarily and will connect grounded battery through one of the windings of a double wound relay 95 to ground at 96. Relay 95 upon energization will lock up in a circuit from grounded battery at 97 through the winding of the relay and through the winding of a sounder 98 to ground at 99. The battery at 97 is a 12 volt battery and the voltage thereof is not sufficient to operate the sounder 98. However, the ground for holding the relay 95 operated will be maintained through the sounder without operating it. Relay 93, upon operation, and release of the key 91, will operate momentarily and then release.

The relay 95, in operating connects a 900 cycle alternating current from supply leads at 100 to the input winding of a shielded transformer 101 to supply power through the transformer 101 to the bridge 130 in the manner shown in Fig. 4, the output leads of the transformer 101 being connected through the switches 15 and 73 to the bridge and to the cable clips (Fig. 3). The relay 93 in operating momentarily connects grounded battery at 102 through its make contact to one of the windings of a double wound relay 103 which will operate and lock up in a circuit from grounded battery at 105 through brush 59, in position 1 make contact of relay 103 to ground at 104.

The momentary energization of relay 93 will also connect grounded battery at 102 through the make contact of relay 93 to contacts 2 to 22 of the arcuate bank of contacts associated with brush 61; however, since brush 61 is at the start of a test on contact 1 of its associated bank the circuit will be broken at this point. The relay 103 will remain locked up until the brush 59 is advanced out of engagement with its first contact and in remaining locked up will connect grounded battery at 102 through a resistance 107 and make contact of relay 103 to the winding of a double wound relay 108 which has both of its windings grounded at 109.

Resistance 107 has sufficient resistance to prevent the circuit through it from operating relay 108 but will let sufficient current flow through it to lock the relay 108 operated when operated over another circuit.

As stated hereinbefore, at the beginning of the test the selector switch 38 is in its 3rd position; that is, its associated brushes are engaging the 3rd contacts in their associated rows of contacts. With this condition present, brush 39 performs no function; brush 40 which is connected to grounded battery at 110 will supply grounded battery through its 3rd contact to the winding of the electromagnet 77. The brush 40 in position 3 will also connect grounded battery at 110 through a break contact of a relay 111 to the winding of a relay 112 and relay 112 which has the other side of its winding connected to ground at 113 will be operated. The operation of relay 112 will connect ground at 113 through its right hand make contact to the winding of relay 111 the other side of the winding of which is connected to the brush 40, whereupon relay 112 will be deenergized due to the energization of relay 111 and relay 111 will lock up from ground at 114 and will remain energized until the brush 40 moves off of contact 3 of the bank of contacts 44. The momentary energization of relay 112 will also through its make contact connect grounded battery at 115 to the sounder 98 to operate the sounder. It will be noted at this time that the operation of the sounder over the circuit from grounded battery at 115 occurred in the previous testing operation as soon as the test was completed and the brush 40 engaged the 3rd contact of its associated bank of contacts 44 and at the beginning of a testing operation relay 111 will be locked up and relay 112 will be deenergized thereby preventing the operation of the sounder 98 until the new test is completed. The operation of electromagnet 77 will cause switch 73 to interconnect its middle contacts with their associated right hand contacts.

Brush 41 is also resting upon the 3rd contact of its associated bank 45 and in that position will connect grounded battery at 110 to the electromagnet 17 and therefore two-way switch 15 will have caused each of its middle contacts to be interconnected with its associated left hand contact. With the electromagnets 77 and 17 energized, the clips 11, 12, 13 and 14 will connect a "quad" to the circuit to measure the capacitance between the two sides of the quad and the actual measurement of capacitance is started.

In making the first or side to side measurement, the clips 11, 12, 13 and 14 will be connected to the bridge in the manner disclosed in Fig. 4; that is, the conductor associated with clip 14 will be connected to a point 148 on the bridge 130, which point 148 is connected to one side of the output winding of the transformer 101. The clip 13 will be connected to the rotary plate 132 of the condenser 131 and to the other side of the output winding of the transformer 101. The clip 12 will be connected to a point 149 on the bridge 130, and to one side of the input winding of a transformer 150 which controls the recording mechanism to be described in detail hereinafter, and the clip 11 will be connected to a point 151 on the bridge 130, and also to the other side of the input winding of the transformer 150. It will be understood that Fig. 4 does not show all of the switches, relays, etc. which connect the wires of the cable to the bridge but is a simplified showing of the bridge with the quad connected thereto.

In making the side to side test the lower arms of the bridge 130 will have a pair of condensers 154 and 155 therein. These condensers are of equal capacitance and may be of any value which will be sufficient to balance the capacitance of the conductors making up the system.

The foregoing brief description of the manner in which the "quad" is connected to the capacitance bridge 130 will, it is believed, render clearer the following detailed description of the means whereby such connections are made.

With electromagnets 77 and 17 energized, clip 11 will be connected through switch 15 to point 151 on the bridge 130, through a condenser 159 to ground and through switch 73 to a point 151' on bridge 130, clip 12 will be connected through switch 15 to point 149 on bridge 130, through a condenser 160 to ground and through a switch 73 to a point 149' on bridge 130, clip 13 will be connected through a switch 15 to movable plate 132 on the bridge 130 and through a condenser 157 to ground, and clip 14 will be connected through switch 15 to one side of the output winding of transformer 101, through a condenser 158 to ground, and through switch 73 to point 148 on the bridge 130.

The condensers 157, 158, 159 and 160 are stabilizing condensers and it will be noted that condensers 157, 159 and 160 are always connected to the points 131, 151 and 149 on the bridge, respectively, whereas condenser 158 is connected to its corner of the bridge only when a side to side measurement is being made.

With the switches 49 and 50 in the condition shown in Fig. 3, that is, with their brushes engaging the first contacts of the associated banks of contacts the first or side to side measurement is started. The side to side unbalance has been assumed to be +26 mmf. and as the condenser 131 rotates through its first cycle after the start key 91 is operated, valves 145 and 147 associated with the digits 6 and 2, respectively, will be tripped.

The valves 145 and 147 will not be tripped every time their associated brushes engage a contact on the commutator, but will only be tripped when valve 156 is tripped.

The filament of valve 143 is connected through a battery 163 to an output terminal of a conventional two-stage amplifier 164, the other output terminal of which is connected to the grid of valve 143. The two-stage amplifier is connected to the output side of the transformer 150, the input of which is connected to the points 149 and 151 of the bridge 130. When the bridge reaches a condition of balance, the current flowing in transformer 150 and the amplifier 164 will be reduced to a minimum. The grid of valve 143, in the absence of an alternating current input, is biased by the battery 163 sufficiently negatively so that the plate current of valve 143 is very small. When the current flowing from the amplifier 164 is reduced to a minimum, the reduction of current in the plate circuit of valve 143 will make point 168, which had been strongly positive with respect to ground, approach the potential of the grid of valve 156. The plate current of valve 143 being minimum, a minimum voltage drop across resistances 142, 187 and 188 will be in effect, therefore, the grid of valve 156 will be biased by a minimum negative voltage since the grid to filament circuit of valve 156 is closed from ground at 169 and 189 through resistances 188, 187 and 142. When the grid to filament potential difference for valve 156 has been reduced to a certain value, the plate current of valve 156 will suddenly increase, thereby causing valve 156, a gas filled valve, to trip. The plate circuit of valve 156 is closed from grounded battery at 173 through resistance 172, break contact of relay 108, resistance 170, plate and filament of valve 156, resistances 142, 187 and 188 to ground at 189. All valves 145 and 147 are gas filled valves and have the same characteristics as valve 156. The plate circuit of valve 147 for tens 2 which will be similar to the plate circuits of all valves 145 and 147 will be closed from grounded battery at 173 through resistance 172, break contact of relay 108, through resistance 175, winding of relay 177, plate and filament of valve 147, through resistances 190 and 188 to ground at 189. The grid circuit for valve 147 for tens 2 which will be similar to the grid circuits of all trip valves 145 and 147, will be closed from the grid of valve 147 for tens 2 through resistance 230 through resistance 190 to the filament of valve 147 for tens 2. A circuit is closed from grounded battery at 173 through resistance 172, break contact of relay 108 through resistances 171, 190 and 188 to ground at 189 to provide a negative voltage bias through resistance 190 to the grid of each trip valve 145 and 147. This bias on valves 145 and 147 will maintain these tubes at sufficiently negative potential with respect to their filaments to prevent their being tripped until valve 156 trips and then only when their associated brushes 144 and 146 are in engagement with segments 138 and 139 on the commutator 137. According to the assumption made herein, this will occur when the brush 144 associated with digit 6 and the brush 146 associated with the digit 2 are engaging their contacts 138 and 139, respectively. When valve 156 trips, as herein above mentioned, the voltage drop across resistance 187 is increased due to the relatively high plate current in valve 156. The effective grid circuits for trip valves 145 and 147 for units 6 and tens 2 will be closed from the grids of valves 145 and 147 for units 6 and tens 2, respectively, through their associated commutator brushes 144 and 146, the commutator segments 138 and 139, through brush 140, through resistances 141, 187 and 190 to the filaments of valves 145 and 147 for units 6 and tens 2, respectively. This change in potential difference between the grids and filaments of valves 145 and 147 will cause them to be tripped. When valves 145 and 147 tripped, relay 176 for units 6 and relay 177 for tens 2 energized. With relay 176 for units 6 energized, ground is closed through the make contacts of relay 176, through one winding of relay 191 for units 6, through break contacts of relay 186, through resistance 185 to grounded battery 193, energizing relay 191 for units 6. With relay 177 for tens 2 energized, ground is closed through the make contacts of relay 177, through the break contacts of relay 222, through one winding of relay 192 for tens 2 to battery 193 in a circuit as described for the 176 relay. When valves 145 and 147 are tripped, the plate current of those valves will boost the voltage drop across resistance 190 so that the potential on the commutator 140 of the rotating condenser 130, which connects to succeeding grids of valves 145 and 147 as the condenser continues to rotate, will be ineffective for tripping any succeeding valve.

It will be noted that there are only 6 valves 147 provided for controlling the registration of the tens values of the capacitance unbalance to be measured. However, the ground at relays 177 for operating the recording mechanism may be sent over one of two paths so that the six relays 177 and associated valves 147 in effect represent ten numbers, depending upon the path through which ground on the make contacts of the relays 177 is directed. A group of relays 222 are provided for shifting this path from ground and operate under control of the brush 59 of switch 50 which will connect grounded battery at 105 to the winding of each of the relays 222, the other side of the windings of which are connected through a resistance to ground at 223.

The relay 191 in operating will connect ground through its winding and right hand make contact, the winding of relay 195, break contact of relay 186 and resistance 185 to grounded battery at 193 to lock relays 195 and 191 operated until relay 186 is energized.

The relay 192 in operating will connect ground through its winding and right hand make contact, winding of a relay 194, break contact of relay 186 and resistance 185 to grounded battery at 193, thereby locking relays 192 and 194 operated until relay 186 is energized.

As soon as the relays 194 and 195 are operated they operate the relay 108 in a circuit from grounded battery at 193 through resistance 185 break contact of relay 186 make contacts of relays 195 and 194 winding of relay 108 to ground at 109. Upon operation of relay 108 it is locked operated over a circuit from ground at 109 through the winding of relay 108, make contact of relay 103, resistance 107 to grounded battery at 102. Operation of relay 108 disconnects battery at 173 from the valves 145, 147 and 156 and from relays 176 and 177.

After the relays 191 and 192 have been locked up as hereinbefore described and the valves 145, 147 and 156 returned to normal, the commutator 137 in continuing its rotation will connect grounded battery at 205 through a pair of brushes 208 and 209, a conducting segment 207, winding of a relay 210 to ground at 211 thereby operating a relay 210. Upon operation relay 210 will connect grounded battery 212 through its make contact, make contact of relay 108, first contact associated with brush 53, break contact on switch 49, winding of magnet 51 to ground. When the switch 49 steps its brushes 53, 54, 55 and 56 to position 2 it automatically advances them step by step to position 19 by making and breaking a circuit from grounded battery at 200 through brush 53 and break contact of the switch.

As switch 49 moves its brushes from position 2 to position 19 it will cause the following operations to be performed: Brush 55 in engaging its associated contacts in positions 2, 3 and 4 will connect grounded battery to the break contacts of relays 195 and 194, respectively, but since relays 195 and 194 are operated these circuits are not effective. Brush 54 in engaging contacts 5, 6 and 7 will connect grounded battery at 193 through the resistance 185, break contact of relay 186, brush 62 of switch 50, in position 1, break contact of a hundreds relay 224 associated with zero, solenoid 121 associated with zero to ground to operate the solenoid and cause the registration of zero in the hundreds order of the measurement to be recorded as the side to side unbalance; brush 54 upon engaging the 8th, 9th, and 10th contacts of its bank will connect grounded battery at 193 to the left hand contacts of the relays 192 and since the relay 192 associated with the digit 2 has been operated, grounded battery will be connected through its left hand contact and the 2 solenoid 121 to ground causing the registration of 2 in the tens order of the measurement to be recorded as the side to side unbalance; and as brush 54 passes through positions 11, 12 and 13 it will connect grounded battery at 193 through the left make contact of relay 191 associated with the digit 6 and the 6 solenoid 121 to complete the recording of the side to side unbalance by the typewriter 120 which will thus have printed on a sheet of paper the number 026 which is the unbalance assumed in the example chosen for illustration in terms of mmf's.

It is apparent that the groups of relays 191, 192 and 224, together with the electromagnetic and vacuum tube relays and other contacts which control them, constitute a multi-denominational accumulator which upon the occurrence of a condition of balance in the bridge becomes fully and almost instantaneously energized to indicate the digits of the number representing the measured capacity. Although the accumulator is immediately disconnected from the rotating commutator segments which caused the registration of the correct amount, the particular denominational relays which were energized remain locked up until the digits represented by them have been successively printed through the actuation of the printing solenoids 121.

As the brush 54 continues its movement it will engage contacts 14, 15 and 16 of its associated bank and in so doing will connect grounded battery at 193 through resistance 185 break contact of relay 186 and winding of electromagnet 47 to ground to operate the electromagnet and move brushes 39, 40 and 41 from their third to their fourth contacts.

As soon as brush 53 reaches position 19 it will connect grounded battery at 105 through brush 61, contacts 19, 20, 21 and 22 associated with brush 53, winding of magnet 51 to ground to cause brushes 53, 54, 55 and 56 to be returned to position 1. In passing through its 20th, 21st and 22nd positions, brush 54 will connect grounded battery at 193 through resistance 185, break contact of relay 186, brush 54, the winding of relays 186 and 196 to ground operating relays 186 and 196. Upon energization relays 186 and 196 will lock up over a circuit from grounded battery at 205 through a brush 206, a conducting segment 204, a brush 203, make contacts and windings of relays 186 and 196, in parallel to ground if the commutator 137 and condenser 131 are not in position to make a test. The relays 186 and 196 will be de-energized as soon as the commutator and motor driven condenser are in position to make the test.

When relays 186 and 196 operated they broke the circuits which were holding relays 194, 195, 191, 192, 224 and 108 operated. With the circuit in this condition the next time the condenser 130 moves through its range the phantom to side one test will be made since at this point brushes 39, 40 and 41 will be in engagement with their 4th contacts, brushes 53, 54, 55 and 56 will be in engagement with their 1st contacts and brushes 57, 58, 59, 60, 61 and 62 will be in engagement with their 1st contacts.

With brushes 40 and 41 engaging their fourth contacts the bridge will be set up to make a test for unbalance between the "side 1" and the phantom circuit by operating electromagnets 16 and 78 from grounded battery at 110 through the brushes 41 and 40, respectively. Brush 40 will also connect grounded battery at 110 through the winding of a relay 213 to ground to operate the relay and hold it operated while brush 40 engages its 4th and 5th contacts.

In making the phantom to side 1 measurement to determine the capacity unbalance between the phantom circuit and side 1, the clips 11 and 12 as shown in Fig. 5 will be interconnected and will be connected to the movable plates 132 of condenser 131 and one side of the output winding of transformer 101, the other side of the output winding of which is connected to the point 148 of the bridge. Clip 14 at this time will be connected to the point 149 of the bridge and one side of the input winding of the transformer 150 whereas clip 13 will be connected to point 151 and the other side of the input winding of the transformer 150. It will be noted at this time that the lower arms of the bridge in making the phantom to side tests, have equal resistances 152 and 153 therein, and that the resistances 152 and 153 may be of any value so long as they are equal.

Fig. 5 discloses diagrammatically the circuit for making the tests between the phantom circuit and side 1. It will be understood that the circuit remains exactly the same in making the test between the phantom circuit and side 2, except that the connections to clips 13 and 11 are reversed and the connections to clips 14 and 12 are reversed.

The operation of electromagnets 16 and 78 will connect clips 11 and 12 to the movable plate 132 of condenser 131 and to one side of the input winding of transformer 101, will connect clip 13 to a point $151^2$ and point 151 and will connect clip 14 to a point $149^2$ and point 149 to connect equal resistances 152 and 153 in the circuit in place of the condensers 154 and 155.

The motor driven condenser 131 will move through its range but the valve 143 will not be tripped since the range of the condenser 131 is only 60 mmf. and the condition of unbalance has been assumed to be +102 mmf. Relay 213 being held operated at this time and the valve 143 failing to trip on the first revolution of the condenser 131, the commutator 137 rotating with condenser 131 will through its conducting segment 207 connect grounded battery at 205 through brushes 208 and 209 and winding of relay 210 to ground at 211. Relay 210 in operating will connect grounded battery at 212 through make contacts of relays 210 and 213 and brush 53 to operate electromagnet 51 thereby to cause brushes 53, 54, 55 and 56, to be moved to their 2nd position.

As soon as brush 53 engages its 2nd contact it will complete a circuit, as described in connection with the side to side measurement, for automatically advancing brushes 53, 54, 55 and 56 through positions 2 to 19. In engaging their 2nd, 3rd and 4th contact brushes 55 and 56 will connect grounded battery at brush 200 through break contacts of relays 195 and 194 to the grounded windings of relays 186 and 196 and through brush 56 and winding of electromagnet 52 to ground. This will result in the operation of magnet 52 to cause brushes 57 to 62, inclusive, to move into engagement with their 2nd contacts and will operate relays 186 and 196 which lock up over brushes 203 and 206 until the condenser 131 is in position to make tests.

The brushes 57, 58, 59, 60, 61 and 62 in position 2 perform the following functions: brush 57 prepares a circuit from strapped contacts 17 to 19 associated with brush 54 through brush 57 and winding of electromagnet 52 to ground, brush 58 will complete a circuit from grounded battery at 105 to operate a relay 220, brush 59 completes a circuit from grounded battery at 105 to operate all relays 222, brush 60 completes a circuit from grounded battery at 105 to operate electromagnet 79, brush 61 completes a circuit from grounded battery at 105 to operate electromagnet 82, and brush 62 will prepare a circuit from contacts 5, 6, and 7, associated with brush 54 to the break contact of relay 224 for zero, make contacts of zero relays 191 and 192, a make contact of 10 relay 192 and zero solenoid 121.

With the circuit in the condition just described, a 50 mmf. condenser 218 will be connected across the bridge from point 132 through condenser 218, make contact of relay 220 switches 78, 82 and 79 to point 149 of the bridge.

As the motor driven condenser 131 passes through its range an effective measurement of the phantom to side one circuit will be made for an unbalance ranging between −52 mmf. and −110 mmf. and no balance being reached, (the unbalance having been assumed to be +102 mmf.), the valve 156 will fail to trip. Therefore, relays 186 and 196 will be operated over a circuit from grounded battery at brush 55, and break contacts of relays 194 and 195 and held energized through brushes 203 and 206 and brush 54 in passing over its associated contacts 5 to 22 will be ineffective. The operation of relay 196 will connect grounded battery through make contact of relay 196 to contacts 19 to 22, inclusive, associated with brush 53, to cause electromagnet 51 to operate four times and return brushes 53 to 56 to position 1. It will then be necessary to measure the unbalance of the phantom to side one circuit in the range +52 mmf. to +110 mmf. and when relay 210 operated as the condenser 131 moved out of its effective range on the previous measurement it connected grounded battery to contact 1 associated with brush 53 and started the brushes 53 to 56, inclusive, moving through positions 2 to 19.

The circuit is arranged to make the test in the range +52 mmf. to +110 mmf. by brush 55 connecting grounded battery through its 2nd, 3rd and 4th contacts, break contacts of relays 195 and 194 brush 56 engaging its 2nd, 3rd and 4th contacts to energize electromagnet 52 and cause it to step brushes 57 to 62 into engagement with their third contacts. Brush 57 is ineffective since its third contact is connected to contacts 17, 18 and 19 associated with brush 54. Brushes 58, 59, 61 and 62 will maintain the same circuits in position 3 as they maintained in position 2. Brush 60 in engaging its 3rd contact will connect grounded battery at 105 through electromagnet 80 to ground, thereby causing condenser 218, to be transferred from its previous positions in the circuit to the following positions: One side of condenser 218 will be connected to the movable plate of condenser 131 and the other side will be connected to point 151.

When the condenser 131 moves through its range again a measurement of the phantom to side 1 circuit will be made in the range +52 mmf. to +110 mmf. and as the bridge reaches a condition of balance valve 156 will trip at the time when brush 144 associated with the digit 2 is engaging its associated contact 138 and brush 146 associated with the digit 5 in engaging its associated contact. Relays 222 being energized at this time, the operation of valve 147 associated with the digit 5 will cause the operation of relay 192 associated with the number 10.

The unbalance of the phantom to side one circuit will now be recorded. The relay 192 associated with the number 10 being operated will operate relays 224 in a circuit from grounded battery at 193, break contact of relay 186 make contact of relay 192 associated with number 10, and windings of relays 224 to ground. When relays 191 and 192 associated with the numbers 2 and 10 operate they will lock operated over a circuit through their right hand make contacts, windings of relays 195 and 194, respectively, to grounded battery at 193.

As the condenser 131 moves out of its effective range after the relays 191, 192 and 224 have been locked up it will through brushes 208 and 209 again cause the energization of relay 210 and start brushes 53 to 56 moving through their cycle to record the unbalance. Brush 54 will in engaging its 5th to 13th contacts connect grounded battery at 193 through brush 62 successively through make contact of relay 224 associated with zero which operated when relay 192 for digit 10 operated, to the winding of the solenoid 121 for printing the digit 1, make contact of relay 192 associated with the number 10 to the winding of the solenoid 121 associated with zero, and make contact of relay 191 associated with the digit 2 to the winding of the solenoid 121 associated with 2.

The relays 186 and 196 are operated in the same manner as described in the printing of the side to side unbalance and the brushes 53 to 56 and 57 to 62 return to the position where they engage their first contacts. Brushes 53 to 56 in returning to position 1 will pause momentarily at position 19 since relay 196 will be deenergized and while brushes 53 to 56 are standing in position 19 brushes 57 to 62 will be advanced to position 1 due to the completion of a circuit from grounded battery at 193 through break contact of relay 186 brush 54 strapped contacts 2 to 22 and brush 57 to the winding of electromagnet 52. As soon as brush 61 reaches its 1st position it will complete the circuit for returning brushes 53 to 56 to position 1. Brush 54 in passing through positions 20, 21, and 22 will operate relays 186 and 196 and prepare the circuit for the next test. Brushes 39 to 41 will have been stepped into engagement with their 5th contacts by brush 54 passing through positions 14, 15 and 16 with relay 186 deenergized.

Brush 40 in engaging the 5th contact will maintain the circuit in the same condition as it was in making the phantom to side one test. But brush 41 in engaging its 5th contact will connect grounded battery at 110 to electromagnet 17 to operate the electromagnet and interchange the connections running to clips 11, 12, 13 and 14. With the electromagnet 17 energized clip 11 will be connected to point 149; clip 13 will be connected to the movable plate of condenser 131 and clip 14 will be connected to point 148'. As will be obvious, this is simply a reversal of the connections of the clips and the test to be made will be the exact opposite of that made in connection with the phantom to side 1 test.

It has been assumed that the phantom to side 2 unbalance is −256 mmf. Therefore, a condition of balance will not be reached until selector switch 50 has moved its brushes to the 9th contacts in their associated banks. In moving into association with the 9th contacts of their associated banks the brushes 57 to 62 will arrange the circuit to make the tests previously described in connection with the phantom to side 1 test and in addition the selector switch 50 will successively add lumps of capacitance to the bridge by successively through brush 58 operating relay 220 and three similar relays 225, 226 and 227 to connect condensers 218, 230, 231 and 232 associated with said relays to the circuit if necessary. The condensers 218, 230, 231 and 232 associated with relays 220, 225, 226 and 227 have a capacitance value of 50 mmf., 100 mmf., 150 mmf. and 200 mmf., respectively.

The brush 62 in its 9th position will, when the printing cycle takes place, be connected to the relay 224 associated with the digit 2 and as a result the condenser 131, upon reaching the position where it of itself has added 56 mmf. to the minus side of the bridge circuit, 200 mmf. having been added to the bridge due to the operation of relay 227, will balance the circuit and the numbers 2, 5 and 6 will be recorded as indicating the phantom to side 2 unbalance of the cable quad. After recording the phantom to side 2 unbalance brushes 53 and 62 will be returned to position 1 in the same manner as described in connection with the phantom to side 1 unbalance, and brushes 39 to 41 of selector switch 38 will be stepped into position 6 preparing the bridge for a new test.

In position 6 brush 40 will complete a circuit for operating relay 112 from grounded battery 110 through brush 40 and the winding of the relay 112 to ground at 113. As soon as relay 112 operates, it will complete a circuit for operating relay 111 as follows: Grounded battery at 110 through brush 40, winding of relay 111 and make contact of relay 112, to ground at 113. The operation of relay 112 will connect grounded battery at 115 through sounder 98, operating the sounder and shunting the current through make contact of relay 95 to disconnect the 900 cycle alternating test current from the bridge circuit thereby notifying the operator that the test has been completed and that a new cable may be attached to the clips 11, 12, 13 and 14 and a new test started.

Although a specific embodiment of the invention has been described in detail, it will be understood that many modifications may be made without departing from the scope of the invention which is to be limited only by the appended claims.

What is claimed is:

1. In a capacitance measuring machine, a bridge circuit, means for connecting an article to said bridge circuit, and means interposed between the bridge circuit and the connecting means and operable in a predetermined cyclic manner in response to a measurement made by the bridge circuit for changing the connections between the article and the bridge to make a series of capacitance tests.

2. In a capacitance measuring machine, a bridge circuit, means for connecting an article to said bridge circuit, means interposed between the connecting means and the bridge circuit and operable in a predetermined cyclic manner in response to measurements made by the bridge circuit for changing the connections between the article and the bridge to make a series of capacitance tests, and means controlled by the bridge circuit and said cyclically operated means for recording the numerical values of the capacity measured.

3. In a measuring apparatus for measuring capacity unbalance in a telephone cable, an electrical circuit, means for securing the cable to the circuit, means interposed between said circuit and the means for connecting the cable to the circuit for changing the connections to make a series of tests in automatic succession, means controlled by the circuit for translating the measurements made into numerical values, and means controlled by said translating means for recording the numerical values of the measurements made.

4. In a measuring and recording apparatus, a bridge circuit, means for connecting an article to be measured to the bridge circuit, means for applying a test current across the bridge, a bridge output circuit including a thermionic valve which is tripped when the bridge circuit reaches a condition of balance, a series of thermionic valves and a commutator mechanism connected to said bridge for registering the amount of capacitance added to the bridge before a condition of balance is reached, and means controlled by said series of valves for recording the numerical value of the amount of capacity added to the bridge to balance it.

5. In a measuring and recording device, a capacity unbalance bridge, an input circuit for applying a test current to said bridge, an output circuit operable when a condition of balance is reached in the bridge circuit including a thermionic valve which trips when the bridge circuit reaches a condition of balance, circuits controlled by said thermionic valve for indicating the amount of capacity added to the bridge to balance it, and a recording device controlled by said last mentioned circuits for recording the numerical value of the unbalance measured by the bridge.

6. A measuring device comprising means for making a measurement of an electrical characteristic of an article, and means controlled thereby for making a record of said measurement including thermionic valves representing digits operated under control of the measuring device for controlling the recording of the characteristic measured in numerical terms, said valves being less in number than the digits which they represent.

7. A measuring device comprising a circuit for measuring characteristics of an article, means for recording a measurement in denominational columns including thermionic valves representing the units denomination to be recorded, and thermionic valves representing the tens denomination to be recorded, said tens denomination representing valves being less in number than the number of denominations which they represent.

8. An apparatus for measuring capacity unbalance in telephone cables comprising a self balancing bridge circuit, means for connecting the wires of a telephone cable to the bridge in a plurality of different ways, means for applying test current to the bridge, and means controlled by the bridge for recording the measurements made thereby.

9. An apparatus for measuring an electrical characteristic of an article comprising an unbalance capacitance bridge circuit, a motor driven air condenser in said circuit, a commutator driven in synchronism with said condenser, a bridge balance detector controlled by said bridge circuit for rendering said commutator effective, and a recording means controlled by the commutator and balance detector for recording numerically the unbalance between predetermined parts of the article.

10. In a measuring device, an electric impedance network, means for cyclically varying said network, a commutator synchronously operable with said varying means, a plurality of indicating devices controlled by said commutator, and means controlled by a condition in said network for actuating an indicating device selected by said commutator.

11. In a testing device for multi-conductor cables, a circuit for making a plurality of tests on said cable, circuits rendered effective under control of said testing circuit, and electrically operated switches controlled by the last mentioned circuits for automatically and sequentially connecting conductors of said cable to said circuit in a plurality of different ways.

12. In a measuring and recording apparatus, a set of relays less than ten representing the digits of a denomination, certain of said relays representing more than one digit, a recorder, and means for shifting the output circuits of said double function relays from one portion of the recorder to another part.

13. In a measuring device, a bridge network having input and output circuits, a thermionic valve having a grid and a cathode connected to the output circuit whereby a reversal of phase of the current in the output circuit will render the thermionic valve effective, and an automatic selector switch controlled by said thermionic valve for adding an impedance element in said bridge circuit.

14. A measuring device for measuring electrical characteristics of multi-conductor cables, means for automatically and sequentially connecting conductors of said cable in a plurality of different ways for making measurements of the characteristics of said cable, bridge circuits associated with said connecting means and responsive to an electrical characteristic of said cable, means controlled by the bridge circuits for selecting and printing the digits composing the numbers representative of the values of measurements made by said bridge circuits, and means for recording said digits in their proper order to indicate said numbers.

15. In a capacitance measuring apparatus, a bridge circuit, means for connecting an article to said bridge circuit, a power source controlled by the bridge circuit and switches interposed between the connecting means and the bridge circuit and driven by power from said source in a predetermined cyclic manner for changing the connections between the article and the bridge to make a series of capacitance measurements.

16. In a capacitance measuring apparatus, a bridge circuit, means for connecting an article to said bridge circuit, a power source controlled by the bridge circuit, and switches driven by power from said source in a predetermined cyclic manner for changing the connections between the article and the bridge to make a series of capacitance measurements.

17. In a capacitance measuring machine, a bridge circuit, means for connecting an article to said bridge circuit, and means interposed between the bridge circuit and the connecting means and operable in a predetermined cyclic manner in response to the completion of a measurement by said bridge circuit for changing the connections between the article and the bridge to make a series of capacitance tests.

18. In an electrical measuring apparatus, a bridge circuit, a source of current applied to said bridge circuit, an output circuit for said bridge circuit, an indicating device controlled by said output circuit when the bridge reaches a condition of balance, means for changing the range of the bridge progressively including a series of selector switches operable under control of the output circuit of the bridge, and means connected to the output circuit of the bridge for causing the value of the characteristic being measured to be registered when the bridge reaches a condition of balance.

CLAIR L. LEMMON.